(12) United States Patent
Simon et al.

(10) Patent No.: US 7,649,429 B2
(45) Date of Patent: *Jan. 19, 2010

(54) CONTROLLING COUPLING STRENGTH IN ELECTROMAGNETIC BUS COUPLING

(75) Inventors: Thomas D. Simon, Marlborough, MA (US); Rajeevan Amirtharajah, Providence, RI (US); John R. Benham, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/165,559

(22) Filed: Jun. 30, 2008

(65) Prior Publication Data

US 2008/0266017 A1    Oct. 30, 2008

Related U.S. Application Data

(63) Continuation of application No. 11/293,703, filed on Dec. 2, 2005, now Pat. No. 7,411,470, which is a continuation of application No. 10/165,424, filed on Jun. 5, 2002, now Pat. No. 7,088,198.

(51) Int. Cl.
*H01P 5/12* (2006.01)
(52) U.S. Cl. .................. 333/24 R; 333/111; 710/100; 710/305
(58) Field of Classification Search .......... 333/24 R, 333/111; 710/100, 305
See application file for complete search history.

(56) References Cited

U.S. PATENT DOCUMENTS

| | | | |
|---|---|---|---|
| 3,516,065 A | 6/1970 | Bolt et al. | |
| 3,609,633 A | 9/1971 | Hargett | |
| 3,619,504 A | 11/1971 | De Veer Olney et al. | |
| 3,651,432 A | 3/1972 | Henschen et al. | |
| 3,671,917 A | 6/1972 | Ammon et al. | |
| 3,673,548 A | 6/1972 | Mattingly, Jr. et al. | |
| 3,740,675 A | 6/1973 | Moore et al. | |
| 3,755,764 A | 8/1973 | Suzuki | |
| 3,764,941 A | 10/1973 | Nick | |
| 3,786,418 A | 1/1974 | Nick | |
| 3,835,252 A | 9/1974 | Ananiades et al. | |
| 3,971,728 A | 7/1976 | Robinson | |
| 4,531,793 A | 7/1985 | Hochgesang | |
| 4,556,268 A | 12/1985 | Noschese | |
| 4,641,322 A | 2/1987 | Hasegawa | |
| 4,654,843 A | 3/1987 | Roza et al. | |

(Continued)

FOREIGN PATENT DOCUMENTS

DE    1 574 593    7/1971

(Continued)

OTHER PUBLICATIONS

Office Action, dated Jan. 16, 2009, issued in related China Application Serial No. 200380107706.8.

(Continued)

*Primary Examiner*—Benny Lee
(74) *Attorney, Agent, or Firm*—Fish & Richardson P.C.

(57) ABSTRACT

A controller sends signals to an electromagnetic coupler associated with a bus. The signals are arranged to set a coupling strength of the coupler.

13 Claims, 2 Drawing Sheets

U.S. PATENT DOCUMENTS

| | | |
|---|---|---|
| 4,768,971 A | 9/1988 | Simpson |
| 4,794,339 A | 12/1988 | LeNir et al. |
| 4,819,001 A | 4/1989 | Ohe et al. |
| 4,825,450 A | 4/1989 | Herzog |
| 4,838,797 A | 6/1989 | Dodier |
| 4,876,535 A | 10/1989 | Ballmer et al. |
| 4,904,879 A | 2/1990 | Rudy, Jr. et al. |
| 4,969,824 A | 11/1990 | Casciotti |
| 5,073,761 A | 12/1991 | Waterman et al. |
| 5,117,202 A | 5/1992 | Tsuruoka |
| 5,171,154 A | 12/1992 | Casciotti et al. |
| 5,179,438 A | 1/1993 | Morimoto |
| 5,190,461 A | 3/1993 | Oorui et al. |
| 5,192,832 A | 3/1993 | Rudy, Jr. et al. |
| 5,197,888 A | 3/1993 | Brodsky et al. |
| 5,276,817 A | 1/1994 | Matschke et al. |
| 5,301,208 A | 4/1994 | Rhodes |
| 5,308,249 A | 5/1994 | Renn et al. |
| 5,315,617 A | 5/1994 | Guida et al. |
| 5,317,481 A | 5/1994 | Hillis et al. |
| 5,363,071 A | 11/1994 | Schwent et al. |
| 5,365,205 A | 11/1994 | Wong |
| 5,385,476 A | 1/1995 | Jasper |
| 5,432,486 A | 7/1995 | Wong |
| 5,454,730 A | 10/1995 | Tozuka |
| 5,470,240 A | 11/1995 | Suzuki |
| 5,479,123 A | 12/1995 | Gist et al. |
| 5,621,913 A | 4/1997 | Tuttle et al. |
| 5,629,838 A | 5/1997 | Knight et al. |
| 5,634,014 A | 5/1997 | Gist et al. |
| 5,638,402 A | 6/1997 | Osaka et al. |
| 5,641,310 A | 6/1997 | Tiberio, Jr. |
| 5,667,388 A | 9/1997 | Cottrell |
| 5,669,783 A | 9/1997 | Inoue et al. |
| 5,687,330 A | 11/1997 | Gist et al. |
| 5,741,152 A | 4/1998 | Boutros |
| 5,781,414 A | 7/1998 | Mills et al. |
| 5,793,668 A | 8/1998 | Krakovyak |
| 5,838,727 A | 11/1998 | Lyon et al. |
| 5,844,213 A | 12/1998 | Peysakhovich et al. |
| 5,876,215 A | 3/1999 | Biernath et al. |
| 5,945,634 A | 8/1999 | Shimirak et al. |
| 5,946,198 A | 8/1999 | Hoppe et al. |
| 5,958,030 A | 9/1999 | Kwa |
| 5,977,841 A | 11/1999 | Lee et al. |
| 6,005,895 A | 12/1999 | Perino et al. |
| 6,007,357 A | 12/1999 | Perino et al. |
| 6,010,369 A | 1/2000 | Itabashi et al. |
| 6,016,086 A | 1/2000 | Williamson et al. |
| 6,039,595 A | 3/2000 | Tseng et al. |
| 6,084,883 A | 7/2000 | Norrell et al. |
| 6,088,741 A | 7/2000 | Murata |
| 6,091,739 A | 7/2000 | Simonovich et al. |
| 6,094,082 A | 7/2000 | Gaudet |
| 6,111,476 A | 8/2000 | Williamson |
| 6,162,065 A | 12/2000 | Benham |
| 6,163,464 A | 12/2000 | Ishibashi et al. |
| 6,167,132 A | 12/2000 | Krone et al. |
| 6,218,916 B1 | 4/2001 | Ishikawa et al. |
| 6,246,729 B1 | 6/2001 | Richardson |
| 6,262,998 B1 | 7/2001 | Hogeboom |
| 6,281,848 B1 | 8/2001 | Nagumo et al. |
| 6,333,719 B1 | 12/2001 | Varadan et al. |
| 6,335,662 B1 | 1/2002 | Del Rosario, Jr. et al. |
| 6,338,127 B1 | 1/2002 | Manning |
| 6,373,712 B1 | 4/2002 | Bailis et al. |
| 6,380,752 B1 | 4/2002 | Irino |
| 6,396,329 B1 | 5/2002 | Zerbe |
| 6,399,898 B1 | 6/2002 | Kwong et al. |
| 6,434,647 B1 | 8/2002 | Bittner, Jr. |
| 6,438,012 B1 | 8/2002 | Osaka et al. |
| 6,442,644 B1 | 8/2002 | Gustavson et al. |
| 6,446,152 B1 | 9/2002 | Song et al. |
| 6,449,308 B1 | 9/2002 | Knight, Jr. et al. |
| 6,493,190 B1 | 12/2002 | Coon |
| 6,496,886 B1 | 12/2002 | Osaka et al. |
| 6,498,305 B1 | 12/2002 | Marketkar et al. |
| 6,498,512 B2 | 12/2002 | Simon et al. |
| 6,533,586 B2 | 3/2003 | Marketkar et al. |
| 6,535,945 B1 | 3/2003 | Tobin et al. |
| 6,546,055 B1 | 4/2003 | Schmidl et al. |
| 6,573,801 B1 | 6/2003 | Benham et al. |
| 6,576,847 B2 | 6/2003 | Marketkar et al. |
| 6,623,292 B1 | 9/2003 | Holler et al. |
| 6,625,682 B1 | 9/2003 | Simon et al. |
| 6,665,624 B2 * | 12/2003 | Simon et al. .................. 702/89 |
| 6,697,420 B1 | 2/2004 | Simon et al. |
| 6,700,223 B1 | 3/2004 | Johansson et al. |
| 6,705,898 B2 | 3/2004 | Pechstein et al. |
| 6,836,016 B2 | 12/2004 | Marketkar et al. |
| 6,882,239 B2 | 4/2005 | Miller |
| 6,887,095 B2 | 5/2005 | Simon et al. |
| 7,068,120 B2 | 6/2006 | Wu et al. |
| 7,075,795 B2 | 7/2006 | Wu et al. |
| 7,075,996 B2 | 7/2006 | Simon et al. |
| 7,080,186 B2 | 7/2006 | Simon et al. |
| 7,088,198 B2 | 8/2006 | Simon et al. |
| 7,126,437 B2 | 10/2006 | Simon et al. |
| 7,252,537 B2 | 8/2007 | Simon et al. |
| 2001/0024888 A1 | 9/2001 | Marketkar et al. |
| 2001/0053187 A1 | 12/2001 | Simon et al. |
| 2002/0018526 A1 | 2/2002 | Osaka et al. |
| 2003/0150642 A1 | 8/2003 | Wu et al. |
| 2003/0152153 A1 | 8/2003 | Simon et al. |
| 2003/0227346 A1 | 12/2003 | Simon et al. |
| 2003/0236005 A1 | 12/2003 | Wu et al. |
| 2004/0127090 A1 | 7/2004 | Simon et al. |
| 2005/0130458 A1 | 6/2005 | Simon et al. |

FOREIGN PATENT DOCUMENTS

| | | |
|---|---|---|
| EP | 0 007 183 | 1/1980 |
| EP | 0 282 101 | 11/1994 |
| EP | 0 447 001 | 12/1997 |
| GB | 2 059 187 | 4/1981 |
| JP | 62-159502 | 7/1987 |
| JP | 03-219714 | 9/1991 |
| JP | 04-294601 | 10/1992 |
| WO | WO 00/72163 | 11/2000 |

OTHER PUBLICATIONS

Office Action, dated Feb. 13, 2009, issued in corresponding China Application Serial No. 03818821.X.

Non-Final Office Action, dated Dec. 9, 2003, issued in priority U.S. Appl. No. 10/165,424.

Response to Non-Final Office Action, dated Jan. 12, 2004, filed in priority U.S. Appl. No. 10/165,424.

Final Office Action, dated Apr. 9, 2004 issued in priority U.S. Appl. No. 10/165,424.

Response to Final Office Action, dated Jul. 12, 2004, filed in priority U.S. Appl. No. 10/165,424.

Non-Final Office Action, dated Feb. 22, 2006, issued in priority U.S. Appl. No. 11/293,703.

Response to Non-Final Office Action, dated May 10, 2007, filed in priority U.S. Appl. No. 11/293,703.

Non-Final Office Action, dated Jul. 26, 2007, issued in priority U.S. Appl. No. 11/293,703.

Response to Non-Final Office Action, dated Oct. 31, 2007, filed in priority U.S. Appl. No. 11/293,703.

Final Office Action, dated Nov. 26, 2007 issued in priority U.S. Appl. No. 11/293,703.

Response to Final Office Action, dated Feb. 19, 2008, filed in priority U.S. Appl. No. 11/293,703.

Crisp, R., "Direct Rambus Technology: The New Main Memory Standard", *IEEE Micro.*, pp. 18-28, Nov./Dec. 1997.

Farjad-Rad, R., et al., "A 0.3-µm CMOS 8-Gb/s 4-PAM Serial Link Transceiver", *IEEE Journal of Solid-State Circuits*, 35(5):757-764, May 2000.

Kaufer, et al., "Controlling crosstalk in high-speed digital systems", *Electronic Systems*, pp. 31-35, May 1999.

Knight, T.F., "Technologies for Low Latency Interconnection Switches", *ACM Symposium on Parallel Algorithms and Architectures*, pp. 351-358, Jun. 1989.

Knight, T.F., et al., "Manufacturability of Capacitively Coupled Multichip Modules", *44th Electronic Components & Technology Conference*, pp. 605-608, May 1994.

Osaka, H., "High Performance Memory Interface for DDR-SDRAM II: XTL (Crosstalk Transfer Logic)", *Systems Development Laboratory, Hitachi Ltd.*, vol. SDL601-XTL-0-074 DMX 006, pp. 1-20, Sep. 15, 2000.

Osaka, H., "XTL Evaluation System Evaluation Memory Sub-System: Chip (HS-TEG; High Speed Test Engineering Group) and DIMM", *Systems Development Laboratory, Hitachi Ltd.*, vol. SDL601-XTL-0-073 DMX 005, p. 1-14, Sep. 15, 2000.

Salzman, D.B., et al., "Capacitively Coupled Multichip Modules", *Proceedings of the 1994 International Conference on Multichip Moducles*, Currigan Hall, Denver, Colorado, pp. 487-494, Apr. 13-15, 1994.

Stearns, T. H., *Flexible Printed Circuitry*, New York: McGraw-Hill Companies, Inc., pp. 109-110 and 232-235, (1996)..

Yang, Chih-Kong Ken, et al., "A 0.5-µm CMOS 4.0-Gbit/s Serial Link Transceiver with Data Recovery Using Over-Sampling", *IEEE Journal of Solid-State Circuits*, 33(5):713-722, May 1998.

Office Action, dated May 7, 2003, issued in related U.S. Patent No. 6,665,624.

Reply to Office Action, dated May 7, 2003, filed in related U.S. Patent No. 6,665,624.

* cited by examiner

CONTROLLING COUPLING STRENGTH IN ELECTROMAGNETIC BUS COUPLING

CROSS-REFERENCE TO RELATED APPLICATIONS

This application is a continuation application of and claims priority to U.S. patent application Ser. No. 11/293,703, filed Dec. 2, 2005, now U.S. Pat. No. 7,411,470, which is a continuation application of U.S. patent application Ser. No. 10/165,424, filed Jun. 5, 2002, now U.S. Pat. No. 7,088,198. The disclosures of the prior applications are considered part of (and are incorporated by reference in) the disclosure of this application.

BACKGROUND

This description relates to controlling coupling strength in electromagnetic bus coupling.

Electromagnetic couplers can be used, for example, to couple data between electronic devices and a communication bus (e.g., a multi-drop bus) in place of more conventional direct electrical connections. Such an arrangement is proposed in U.S. Pat. No. 5,638,402.

The coupling strength of a coupler depends on physical characteristics of the elements that make up the coupler.

DETAILED DESCRIPTION OF THE INVENTION

Figure 6:
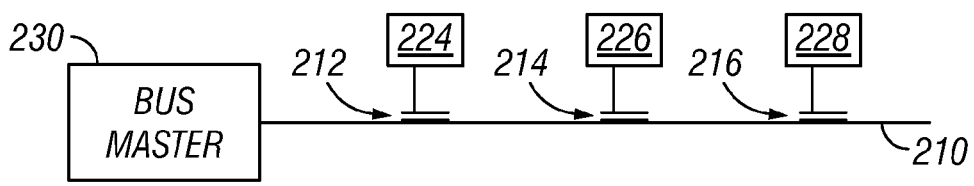
FIG. 6 is a schematic side view of a bus.

As shown in FIG. 6, in one approach to implementing a high-speed multi-drop bus 210 using electromagnetic couplings 212, 214, 216, the coupling strengths of the couplings between the bus and the communicating devices 224, 226, 228 are all controlled to be uniformly within a targeted range. One way to control the coupling strengths to be uniform is to impose tight manufacturing tolerances on the dimensions and properties of dielectric materials associated with the couplings. Another is to use zigzag coupler geometries that reduce the impact on coupling strength of variations in the geometric precision of the coupling arrangements. Zigzag coupling arrangements are described in U.S. Pat. No. 6,573,801, issued Jun. 3, 2003.

Controlling coupling strengths to fall uniformly within a particular range achieves a compromise between competing constraints. Excessive coupler strengths cause large impedance disturbances along the bus, thereby degrading signal integrity. High coupler strengths also divert too much signal energy into drop-off points that are closer to the bus master 230, leaving little energy to divert to distant drop-off points. On the other hand, insufficient coupler strength causes even the nearest drop-off points to receive or impart too little energy from or to the bus.

Using deliberately non-uniform coupling strengths along the bus reduces the cost associated with tight manufacturing tolerances, because couplers having a range of different strengths become useful. Yield increases and cost is reduced.

Aside from taking advantage of the natural variation in size and other parameters resulting from broad manufacturing tolerances, variations in coupler strength can be achieved more deliberately, for example, by controlling dielectric thicknesses, dielectric constants, and the number of zigzag geometry crossover points on the coupling traces of the bus and the coupler. The choice among possible mechanisms could be based on cost. For example, if the cost of engineering and manufacturing multiple categories of modules to be attached to the bus is a concern, the system could use uniform daughter cards and make alterations only to parameters of the motherboards that affect the coupling strengths at various points along the bus.

Variations of motherboards could include dielectric spacers of different heights glued to the motherboard at the locations of drop-off points along the bus. The widths of motherboard coupling traces could be different at different coupler locations.

For example, there may be applications in which it is useful to arrange the different couplers in an order such that the coupling strengths rise and/or fall other than monotonically with distance along the bus.

Figure 1:
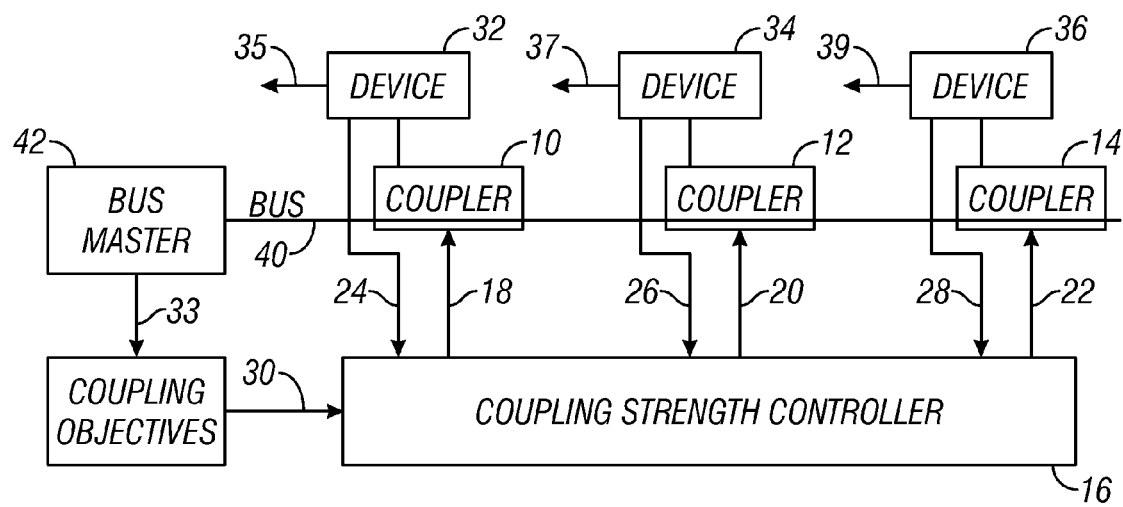
FIG. 1 is a block diagram of a bus.

As shown in FIG. 1, coupling strengths of a series of electromagnetic bus couplers 10, 12, 14 also can be controlled dynamically by a coupling strength controller 16 to achieve a wide variety of goals. In the example shown in FIG. 1, the controller provides signals on lines 18, 20, 22 to the couplers to control the coupling strengths and receives information about coupling strengths on lines 24, 26, 28 from the devices 32, 34, 36 that are served by the couplers. For example, the devices may include circuitry to measure the amplitudes of incoming signals or to use error detection info in the data stream to measure bit error rate which may be a complex function of the couplers' strengths. The controller uses the strength information and information 30 about coupling objectives to generate appropriate control signals to the couplers. The controller can therefore operate as a feedback loop. The coupling objectives may relate to the operation of the bus or a bus master 42 or one or more of the devices 32, 34, 36 that communicate through the couplers to a bus 40. For example, the coupling objectives could include specific or relative values for the coupling strengths of the respective couplers. In some examples, the bus master could provide information 33 about data that is about to be communicated to respective couplers, and the controller could use that information as the basis for controlling coupling strengths. In some examples, the devices 32, 34, 36 could provide information or instructions 35, 37, 39 that represent coupling objectives to be enforced or taken into account by the controller. The controller could use combinations of coupling objectives in deciding how to control the coupling strengths.

The controller may include a microprocessor or circuit logic, memory, and algorithms that enable it to use the coupling strategies, target coupling strengths, and measured coupling strengths, to generate control signals.

Figure 2:
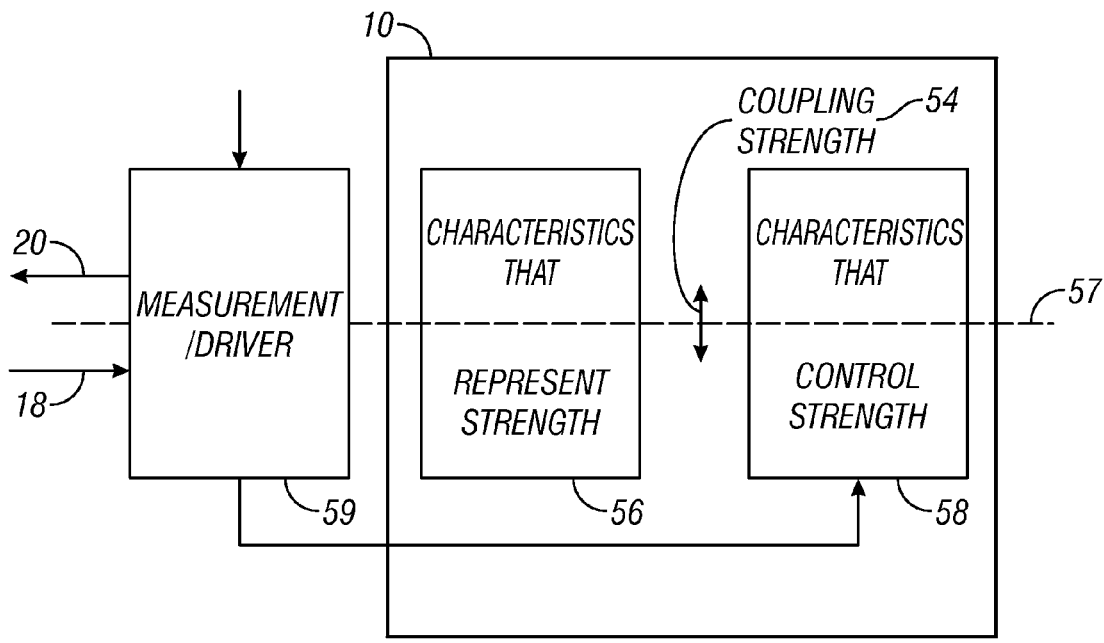
FIG. 2 is a block diagram of a coupler.

As shown in FIG. 2, each of the couplers 10 is characterized by a coupling strength 54 that represents the strength of electromagnetic coupling across a coupler interface 57 between two coupling elements such as two traces, one or both of which may be zigzag traces. One of the traces is associated with the bus and the other is associated with a device. The two traces are separated by a small gap. The coupling strength represents the extent to which the bus on one hand and a device on the other hand are able to share energy across the interface. In addition to coupling with each other, each of the traces may also be coupled with a reference or ground plane. The various couplings affect the coupling strength between the two traces. The coupling strength is determined by a complex set of variables that include, for example, the sizes, shapes, and materials used in fabricating the traces, the reference planes, the spacers between each of the traces and its associated reference plane, and the spacer between the traces, and capacitive and inductive effects associated with the different elements. One or more of the elements that make up the coupler have measurable characteristics 56 that represent the coupling strength. One of more of the elements also have controllable characteristics 58 that can be used to control the coupling strength of the coupler. The measurable characteristics can be determined by a measurement/driver circuit 59 and the information can be fed back to the controller on line 20. The measuring would typically occur in the circuitry of the devices 32, 34, 36 as shown in FIG. 1. The controllable characteristics can be altered by a driver portion of the measurement/driver circuit based on instructions received on line 18 from the controller. The measurement/driver circuit could alternatively be part of the controller.

The coupling strength of a coupler could be measured by sensing the voltage level of a signal that has passed through the coupler and comparing it with a voltage reference value. In a more complex scheme, error rates of data that have passed through a coupler could be measured during a period of calibration and the coupling strength could be adjusted to drive the error rate to an acceptably low level. To save time, this scheme might extrapolate error rates from a relatively shorter calibration period with coupling strength settings that produce high error rates which can be measured quickly.

By measuring the effects of coupler strength and using a feedback loop to adjust coupling strengths electrically, the benefits of non-uniform coupling strength distributions can be realized more fully. For example, instead of targeting an average coupling strength value for each coupler along a bus with an achievable accuracy, or selecting broad "bins" in which to categorize manufactured couplers, each coupler can be adjusted electrically to have a coupler strength close to an intended value, thus reducing the effects of manufacturing tolerances. In addition, configuration-time conditions such as which bus positions are populated and run-time conditions such as temperature and supply voltages can be optimized for by appropriate changes to coupler strength targets.

For example, if the bus is a memory bus which may be populated with memory cards up to its maximum capacity, coupling strengths may be electrically controlled to suit the particular number of memory slots populated in a given system. If all slots are populated, the coupling strengths could be set to a profile of coupling strengths along the bus which is ideal for that configuration. Without control of coupling strengths, this worst-case profile must always be targeted, within manufacturing accuracy, for each coupler position. With control of coupling strengths, if only a portion of the slots are populated, the coupling strengths of the unpopulated slots could be set extremely low, while the populated slots could be set to coupling strengths including some profile of higher strengths than if all slots are populated. The benefit for the system with fewer populated slots may be higher bandwidth, lower error rates, or lower power dissipation. Similar benefits can be obtained in other applications if coupling strengths can be electrically adjusted in response to any measurable device or system condition. Feedback control could be used to optimize a bus system at run time for its own bus configuration. Sensors could be provided to determine when a slot is not occupied and that information could be provided to the controller.

Dynamic control also would permit adjusting coupler strengths in response to changing data patterns, for example, from data burst to data burst or even from bus cycle to bus cycle. For example, if the bus master has addressed a particular bus slot for an upcoming read or write operation, it is undesirable to route equal amounts of signal energy to other, un-addressed slots that will not use the information. Instead, the un-addressed slots can be turned off by drastically lowering their coupling strength during the data burst. The effect is to make the presence of the un-addressed slots largely invisible to the bus, or to make the bus look effectively as if it were populated by only one slot, the relevant one. This approach may again result in increased bandwidth, lower error rates, reduced power dissipation, etc.

A variety of coupler characteristics can be used to dynamically and electrically control coupling strength.

Figure 3:
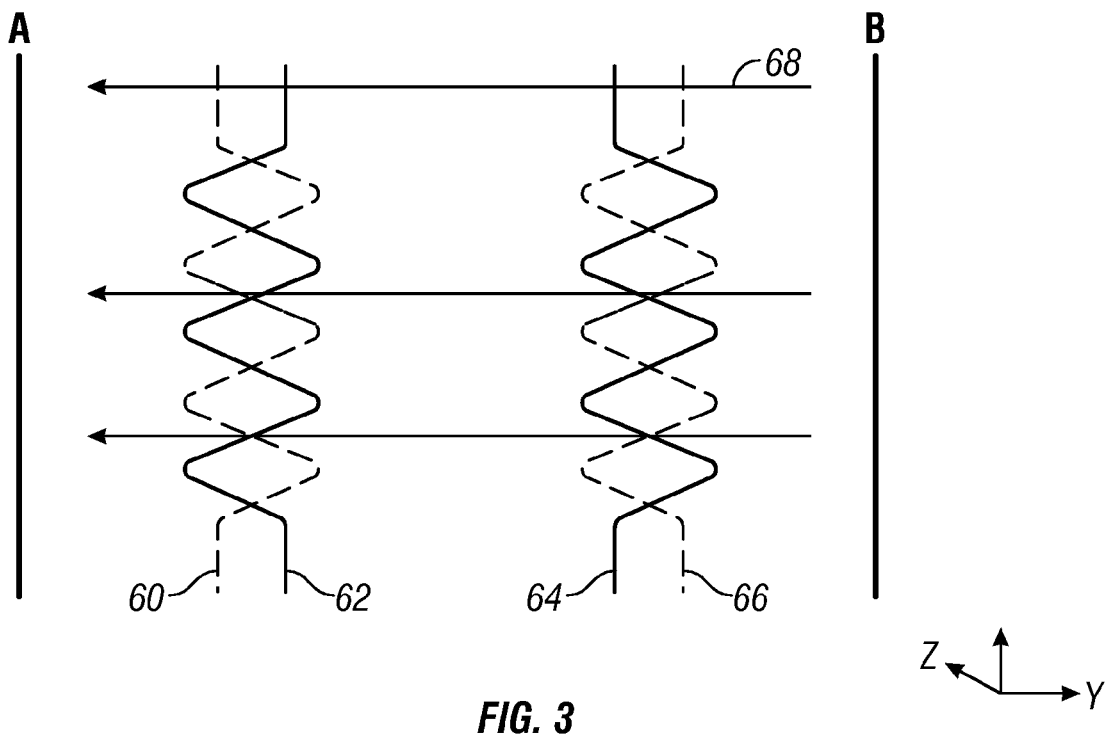
FIGS. 3 and 4 are top and side views, respectively, of couplers.
Figure 4:
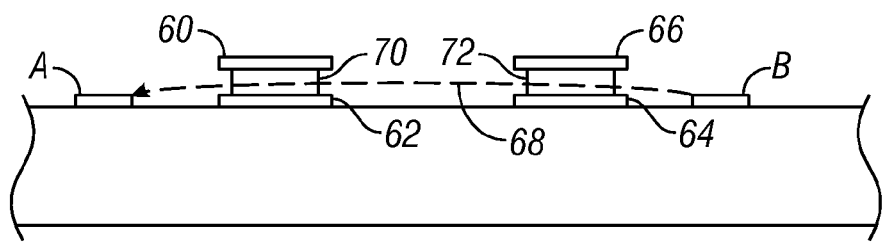

In one example, shown in FIGS. 3 and 4, zigzag coupling traces 62, 64 on bus portions of two couplers and zigzag coupling traces 60, 66 on device portions of two couplers are spaced apart by spacers 70, 72 (FIG. 4). The spacers are made of electrically nonlinear (and possibly anisotropic) material in which properties such as permitivity or permeability in the Z (FIG. 3) direction are influenced by conditions such as a strength of a magnetic field 68 formed in the Y (FIG. 3) direction. For example, yttrium iron garnet (YIG) has the property that its permeability in one direction depends on the DC magnetic field in another. Such materials are already used to make devices such as isolators, circulators, filters, and current controlled oscillators. In FIGS. 3 and 4, two extra electrodes A and B are added on two sides of the bus with the couplers between them. Electrodes A and B are used to establish a DC field 68 of a selectable value in direction Y to influence the permittivity or permeability properties of the spacers 70, 72 in direction Z. The strength of the field established between electrodes A and B is controlled by controller 16 (FIG. 1) through the driver. The resulting permeability of the spacers along the Z axis determines the coupling strengths of the couplers.

Figure 5:
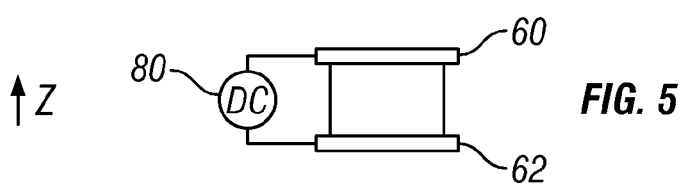
FIG. 5 is a schematic view of a coupler.

Another implementation generates fields in the same Z direction as the coupling to alter the electrical behavior of the coupler. For example, as shown in FIG. 5, dispensing with electrodes A and B of FIGS. 3 and 4, the properties in direction Z can be directly influenced by a DC bias 80 imposed between the traces 60 and 62 in the Z direction, for each coupler, and controlled by controller 16. Varactors, for example, are structures in which the capacitance is determined by the DC voltage across the varactor. Such DC biasing is effective with couplers that use only AC components of the signal to convey information across the couplers. Couplers including varactors could be made by using a PN diode for the dielectric spacer, as an example for high switching speed, or liquid crystal polymers, as an example for lower switching speed.

In other implementations, the size of the Z separation imposed by the spacer could be controlled instead of the electrical properties. Piezoelectric materials change their dimension in response to electric fields and magnetorestrictive materials change their dimensions in response to magnetic fields. Such materials are currently used in such disparate applications as speakers, microphones, motors, and even artificial muscles. Materials with electro-rheological characteristics, in which a deformation or flow characteristic can be controlled electrically, change their viscosity in response to an applied field. This may present the opportunity to soften the spacer material briefly while another field's force sets the Z dimension of the gap and then harden the spacer material again to freeze and remember the Z-dimension setting. These mechanical variants could provide slower forms of control than purely electrical ones.

In another example, a coupler (for example, a microstrip, a stripline, or a coplanar waveguide) could be fabricated on a ferroelectric substrate. Then the coupling strength can be varied by controlling the DC potential between the coupled elements and the mean DC potential between the coupled elements and a reference ground. Existing ferroelectrics (e.g., $LaAlO_3$ or $Ba_{0.5}Sr_{0.5}TiO_3$) would be restricted to small feature sizes (~0.5 µm line widths/line separations) and operating frequencies greater than 12 GHz.

Signals concerning the measured coupling strengths of the couplers might be sent to the coupling strength controller from the couplers themselves rather than from the devices served by the couplers.

Although certain examples and implementations have been discussed above, other embodiments are also within the scope of the following claims.

For example, the controller need not receive strength information about all of the couplers or about any of them. The controller can control the coupling strengths in a non-feedback mode based on predetermined control regimes. Similarly, the controller need not send control signals to all of the couplers. The strength of only one or a few of the couplers may be controlled dynamically while the others have static strengths.

What is claimed is:

1. A method comprising:
   determining that a data pattern on a bus is changing, wherein the bus is coupled to a collection of devices via a collection of electromagnetic couplers; and
   controlling coupling strengths of the couplers based at least in part on the determination.

2. The method of claim 1, wherein controlling the coupling strengths of the couplers comprises:
   determining that a first device is unaddressed in an upcoming operation; and
   setting a coupling strength of a first of the couplers essentially to zero,
   wherein the first of the couplers is between the bus and the first device.

3. The method of claim 1, wherein controlling the coupling strengths of the couplers comprises:
   measuring the coupling strengths of at least some of the couplers; and
   feedback controlling the coupling strengths based on the measurements.

4. The method of claim 1, wherein controlling the coupling strengths of the couplers comprises deciding how to control the coupling strengths based on information or instructions representing objectives for coupling the bus and the devices.

5. The method of claim 1, wherein controlling the coupling strengths of the couplers comprises sending control signals from a coupling strength controller to the couplers via a collection of signal lines between the coupling strength controller and the couplers.

6. The method of claim 1, wherein controlling the coupling strengths of the couplers further comprises receiving coupling strength measurements from the devices at a coupling strength controller via a collection of signal lines between the devices and the coupling strength controller.

7. The method of claim 1, wherein controlling the coupling strengths of the couplers comprises controlling the coupling strengths of at least two of the couplers to have different non-zero values.

8. A motherboard comprising:
   a bus;
   a collection of slots on the bus;
   a collection of couplers with controllable coupling strengths, each associated with a slot and disposed to controllably couple the bus to a device populating the associated slot;
   a collection of sensors, each associated with a respective slot and configured to sense whether the associated slot is populated; and
   a controller to control coupling strengths of the couplers based on the sensing of whether the slots associated with the sensors are populated.

9. The motherboard of claim 8, further comprising information or instructions representing objectives for coupling the bus and the devices populating the slots.

10. The motherboard of claim 9, wherein the controller comprises a data processor to control the coupling strengths based on the information or instructions representing the objectives and the sensing of whether the slots associated with the sensors are populated.

11. The motherboard of claim 8, further comprising:
    a first collection of signal lines between the controller and the couplers; and
    a second collection of signal lines between devices populating the slots and the controller.

12. The motherboard of claim 8, wherein the controller is to control coupling strengths of the couplers of at least two of the couplers to have different non-zero values.

13. A motherboard comprising:
    a bus;
    a collection of slots on the bus;
    a collection of couplers with controllable coupling strengths, each associated with a respective slot and disposed to controllably couple the bus to a device populating the associated slot;
    a controller to control coupling strengths of the couplers based on the sensing of whether the slots associated with sensors are populated; and
    a collection of signal lines between the controller and the couplers in the collection.

* * * * *